May 8, 1951 C. J. H. A. STAAL 2,551,816

MULTIPLEX TRANSMITTING DEVICE

Filed Feb. 18, 1948 2 Sheets-Sheet 1

CORNELIS JOHANNES ANTONIUS STAAL
INVENTOR.

BY [signature]

AGENT.

MULTIPLEX TRANSMITTING DEVICE

Filed Feb. 18, 1948 2 Sheets-Sheet 2

CORNELIS JOHANNES ANTONIUS STAAL
INVENTOR.

BY [signature]

AGENT.

Patented May 8, 1951

2,551,816

UNITED STATES PATENT OFFICE 2,551,816

MULTIPLEX TRANSMITTING DEVICE

Cornelis Johannes Henricus Antonius Staal, Eindhoven, Netherlands, assignor to Hartford National Bank and Trust Company, Hartford, Conn., as trustee Application February 18, 1948, Serial No. 9,168
In the Netherlands March 8, 1947

8 Claims. (Cl. 179—15)

The invention relates to a multiplex transmission arrangement comprising a plurality of transmission channels which operate periodically in the rhythm of the so-called cycle frequency and in succession in the rhythm of the so-called control-frequency for transmission of signal pulses which characterize signals different in phase. Such arrangements are used for simultaneous transmission of several telephone calls or signals of other pattern, such, for example, as Morse signals, facsimile- and telex signals.

During each system cycle the transmission channels become transiently operative on one occasion, for example, under the action of successive, rectangular voltage pulses, sometimes referred to as gating pulses, and/or under the action of a mixing voltage which varies linearly with time, which occurs during the control-period for one definite channel only and by means of which the signals required to be transmitted are converted into pulse-phase modulation.

In the receiver co-operating with such a transmitter periodic and successive release of the various receiver channels must occur in accurate isochronism with release of the corresponding transmitter channels and in view thereof it is common practice to emit one synchronizing pulse per transmission cycle. One of the transmission channels of such a system is frequently used to transmit synchronizing pulses the duration of which is similar to at least one control-period, the synchronizing pulses therefore being differentiated as compared with the signal pulses by a longer duration and being adapted to be separated in the receiver from the signal pulses by the use of an integrating network (cf. Wireless World, June 1946, page 187, Details of Army Wire Station No. 10).

A serious disadvantage of known multiplex systems of the kind described is constituted by the so-called cross-talk i. e. the occurrence in a given channel of signals from other channels.

According to the invention, it has been found that at the receiving end of such a transmission system, apart from many other kinds of cross-talk, cross-talk occurs from the receiver channel operating just before reception of synchronizing pulses to other channels, particularly in the case of a high "modulation percentage," that is to say comparatively large phase shift of the signal pulses.

The invention refers to a particular construction of a multiplex transmitter of the kind described above for pulse-phase modulation for the purpose of limiting the cross-talk occurring at the receiving end, so that a higher modulation percentage becomes permissible at the transmitter end, and in addition an appreciable economy in energy is achieved.

According to the invention, the duration of the synchronizing signal is chosen to be smaller than a control-period for the synchronizing channel and provision is made for the synchronizing signal to occur primarily during the latter half of the control-period for the synchronizing channel only.

The measure according to the invention has the effect of reducing the difference in duration between the synchronizing signal and the signal pulses but the resultant disadvantages at the receiving end in regard to separation of synchronizing signals and signal pulses, no matter whether this separation is effected by the use of discriminating or of an integrating network, are offset by the advantages achieved, provided that the duration of the synchronizing signal is two or three times that of the signal pulses. The synchronizing signal may be constituted by a simple signal, but in order to economize energy it may be interrupted transiently, so that a so-called double-pulse is produced.

The measure according to the invention furthermore enables a construction of a multiplex transmitter of the present kind which is highly favourable from various points of view, particularly in the case of a transmitter comprising transmission channels successively released by gating pulses.

As a matter of fact, in each of the signal channels the signal voltage to be transmitted is preferably superimposed on a mixing voltage which occurs at least during operation of the particular channel and varies linearly with time and by feeding the combined voltages to a threshold arrangement pulses are provided, the duration of which varies with the instantaneous signal amplitude (pulse width modulation), said pulses for converting the pulse-width modulation into pulse-phase modulation, being fed, through a discriminating network common to all signal channels, to an output resistance, and the synchronizing channel cascade being constructed in a manner similar to that of the signal channel cascades, the mixing voltage being, however, fed without superimposure of a modulating alternating voltage, to the threshold arrangement in order to provide pulses of constant duration which are fed direct to the output resistance of the discriminating network common to the other transmitter channels.

The essentially identical construction of all the transmitter channels not only renders manufacture of the transmitter simpler and cheaper but also simplifies its maintenance, since it is possible to use exactly the same amplifying tubes as in the signal channels in the synchronizing channels and, in the case of need, if the synchronizing channel on becoming defective cannot be repaired within a short time, one of the signal channels may be used, after slight modification, to constitute the synchronizing channel, or else a given circuit element, for example a gating pulse generator or a pulse generator may be removed from a signal channel and arranged in the synchronizing channel.

In order that the invention may be clearly understood and readily carried into effect, it will now be described more fully with reference to the accompanying drawing.

Figure 1:
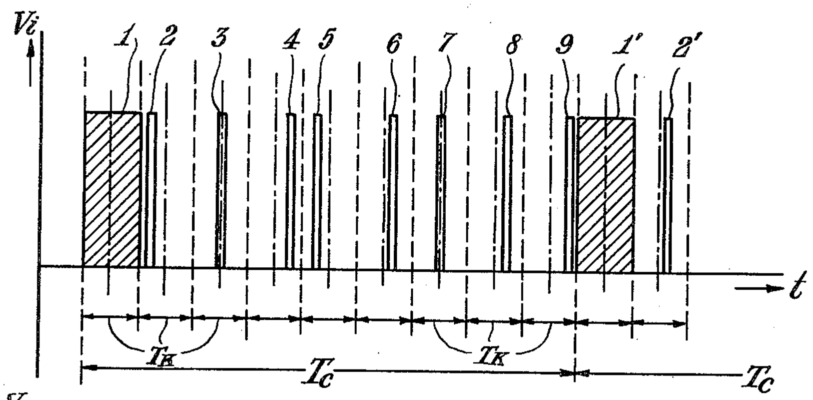
Fig. 1 illustrates the pulses emitted during over one period of the cycle frequency with a known system comprising 9 transmission channels, one of which serves to transmit synchronizing pulses.

Fig. 1 illustrates the pulses emitted and thus produced at the receiver end in a 9-channel multiplex system after amplitude demodulation, limitation and the like in a time diagram for a duration corresponding to over one cycle period $T_c$ (99 $\mu$ secs.). A cycle period is subdivided into 9 equal channel periods $T_k$ (11 $\mu$ secs.), the first of which is successively occupied by the synchronizing pulses 1, 1' (shown cross-hatched); in the other 8 channel periods there occur signal pulses 2, 3 . . . , 8, 2' and so forth, which exhibit a constant width (1.5 $\mu$ secs.) and which characterize the transmitted signal by their phase shift with respect to the centre (indicated by dot-dash lines) of a channel period.

The signal pulses 3 and 7 do not exhibit any phase shift, the signal pulses 2 and 5 exhibit a negative phase shift and the signal pulses 4, 6, 8 and 2' a positive phase shift, that of signal pulse 9 being a maximum.

As is well-known, synchronizing and signal pulses may be separated by an integrating network and a subsequent threshold arrangement.

Figure 2:
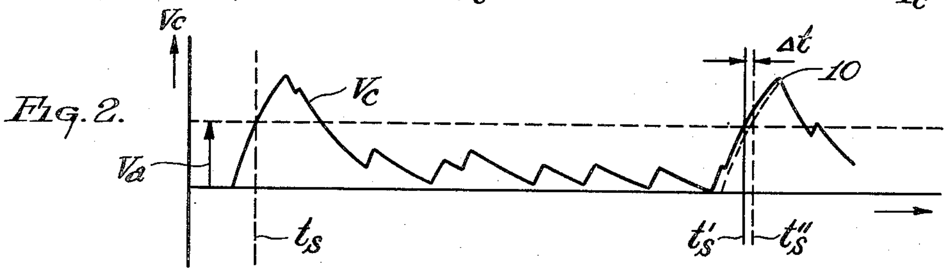
Fig. 2 illustrates the output voltage of an integrating network used, according to prior knowledge, at the receiving end to separate synchronizing and signal pulses.

Referring to Fig. 2, $V_c$ designates the output voltage set up across the condenser of such an integrating network with a time constant of about 8 $\mu$ secs. and $V_a$ the threshold voltage, a synchronizing pulse being set up in the receiver each time the output voltage $V_c$ exceeds the threshold voltage $V_a$ in a positive sense, that is to say at the instants $t_s$ and $t'_s$.

It may be seen from Fig. 2 that, as ascertained by the applicant, the cross talk is due to the fact that the position of the instant $t_s$ or $t'_s$ respectively greatly depends on the lapse of time between the occurrence of signal pulse 9 and synchronizing pulse 1'. With the maximum positive phase shift of signal pulse 9 the condenser voltage $V_c$ exceeds the threshold voltage $V_a$ considerably earlier (instant $t'_s$) (to an extent which varies with the phase shift of the signal pulse 9) than with the maximum negative phase shift of this pulse, the condenser voltage exhibiting the variation shown in dotted lines at 10 with an instant of crossing $t''_s$, which is by a lapse of $\Delta t$ later than $t'_s$. The synchronizing pulses occurring in the receiver are thus given a phase modulation which corresponds to the modulation of the signal pulse 9 and is consequently audible with equal intensity in all the other channels.

Figure 3:
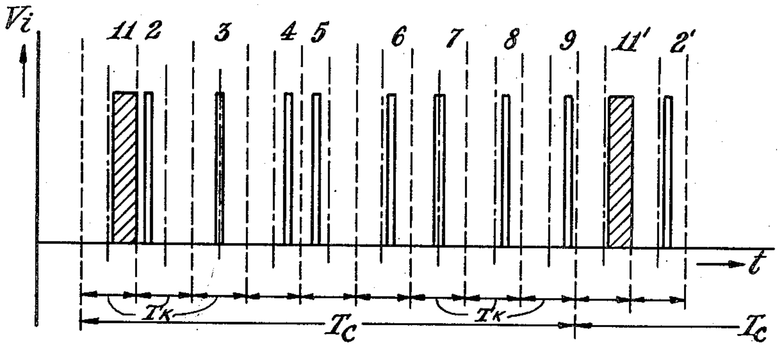
Fig. 3 illustrates the pulses emitted during over one period of the cycle frequency when employing the invention.

Fig. 3 illustrates signals emitted in accordance with the invention to avoid the said cross-talk, the synchronizing pulses 11, 11' having a duration of only 5 $\mu$ secs. and terminating periodically at the instant at which the control-period for the synchronizing channel terminates. The synchronizing pulses thus fall completely within the latter half of the control period, which has a duration of 11 $\mu$ secs.

Figure 4:
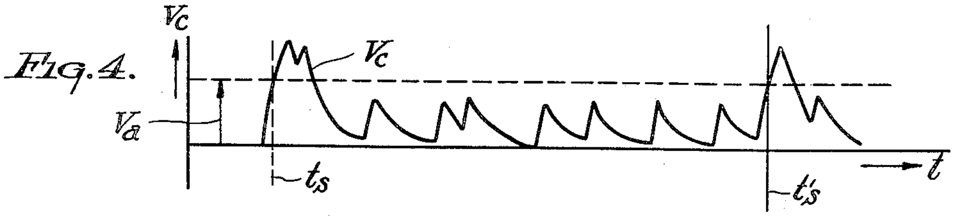
Fig. 4 illustrates the output voltage, then occurring at the receiver end, of an integrating network used to separate synchronizing and signal pulses.

Now, if at the receiving end use is made of an integrating network and a subsequent threshold arrangement for separating synchronizing and signal pulses, the voltage $V_c$ shown in Fig. 4 is produced across the integration condenser, if the time constant of the integrating network is about 4 $\mu$ secs.

The instants at which the synchronizing pulses start in the receiver when a threshold voltage $V_a$ is employed, are designated, as in Fig. 2, by $t_s$ and $t'_s$.

The instant $t'_s$ thus shifts to a very small extent only for a variation in phase of signal pulse 9; even for the maximum positive phase shift of signal pulse 9, as indicated, the residual voltage occurring across the integration condenser at the time of the occurrence of the front of the incoming synchronizing pulse 11' is so small as to provoke a shift of the instant $t'_s$ which, compared with the condition prevailing in the absence of the signal pulse 9 is inappreciable and is even not capable of being shown on the drawing. Thus, the measure according to the invention has the effect of appreciably restricting the cross-talk through the synchronizing channel. As a matter of course, the use of a double pulse to constitute the synchronizing signal, also has this effect.

Figure 5:
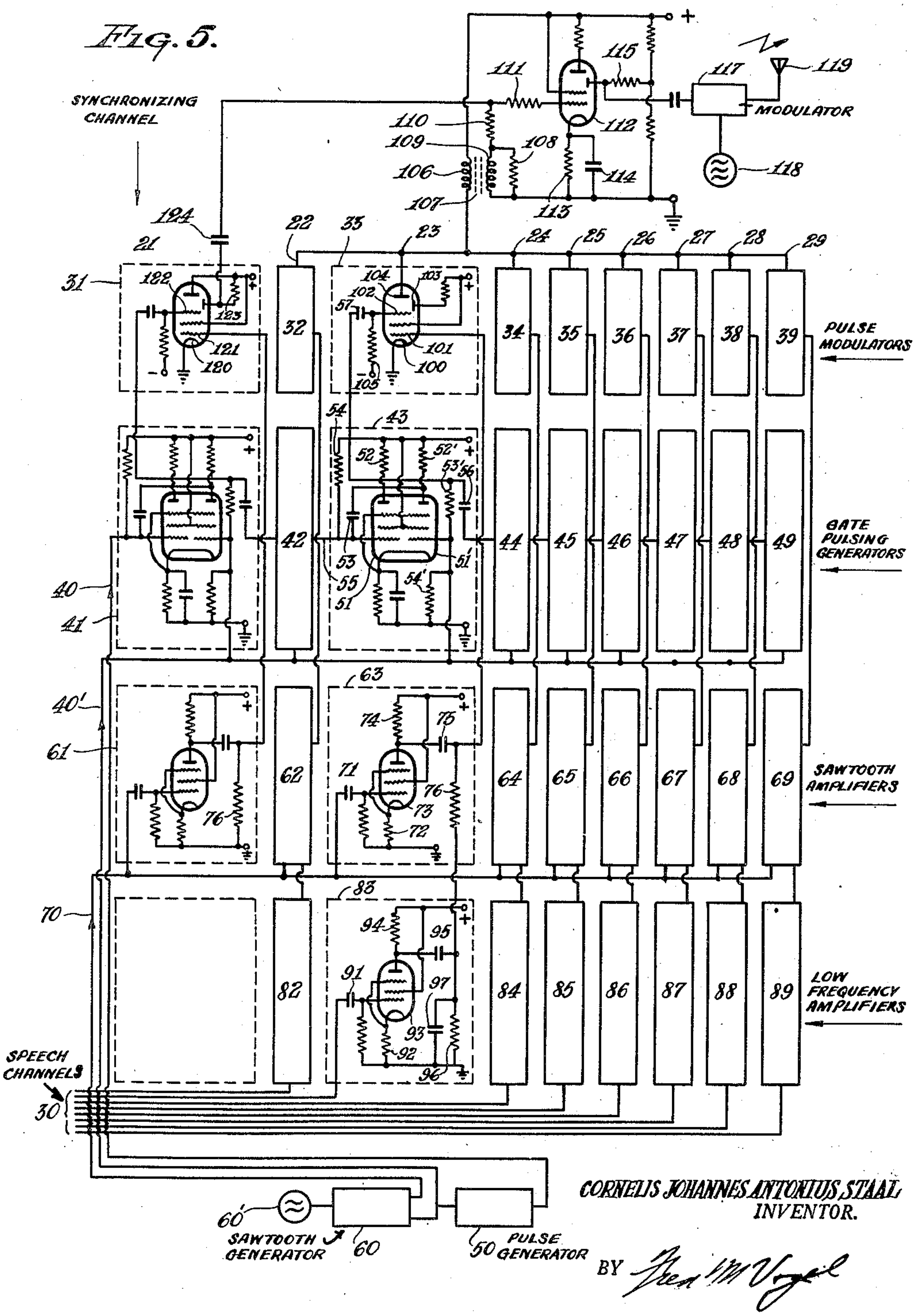
Fig. 5 shows, partly in block diagram, a circuit-arrangement of a particularly suitable form of multiplex transmitter according to the invention.

Fig. 5 shows a particularly advantageous form of multiplex transmitter in which the invention is embodied and which permits of emitting carrier-wave signals modulated by pulse signals as shown in Fig. 3.

The transmitter arrangement shown comprises nine transmitting channels 21 to 29, among which channel 21 serves to convey cycle-synchronizing pulses, whereas the others constitute, for example, speech channels, of which the input terminals are individually shown at 30. The synchronizing channel 21 and one of the identical speech channels, viz. 23, are shown in detail-diagram in the figure.

All the channels comprise pulse modulators 31 to 39, which are caused to become operative periodically in the rhythm of the cycle frequency and successively in the rhythm of the control-frequency by gating pulses from a number of pulse generators 41 to 49 which corresponds to the number of channels, each of the generators supplying one of the pulses of a sequence of gate pulses.

The sequence of pulse generators is caused to become operative in the rhythm of the cycle frequency by a cycle synchronizing pulse derived from a pulse generator 50, and fed through a lead 49 to the first pulse generator 41. Pulse generator 50 operates as a frequency partition device (ratio 1:9) for pulses of a recurrence frequency which corresponds to the control-frequency, said pulses being supplied from a pulse generator 60, which is synchronized by a sine voltage of control-frequency from an oscillator 60'.

Upon each occurrence of a cycle synchronizing pulse the pulse generators 41 to 49 excite one another in succession the termination of the gating pulses being initiated by control-pulses fed to all pulse generators in parallel combination through a lead 40'. The latter pulses occurring in the rhythm of the control-frequency are derived from the above mentioned pulse generator, 60.

The gating pulse generators are identical for all channels and only that in the channel 23 is more fully described and shown in detail-diagram.

The gating-pulse generator 43 comprises two pentodes 51, 51' housed in a single tube and having separate anode resistances 52, 52', interconnected collector grids or screen grids respectively and a common cathode. The pentodes are coupled crosswise by the use of a condenser 53 and a resistance 53' and thus they cut off one another reciprocally.

This arrangement known per se shows only two stable working points; at the first working point, referred to hereinafter as the condition of rest, the pentode 51 takes maximum anode current and pentode 51' is cut off; at the second working point, the working condition, conditions are reversed and pentode 51 is cut off, whereas pentode 51' takes current. Owing to the cruciform coupling changing from the one working point to the other takes place very rapidly. Upon application of a high positive bias voltage (through resistance 54) to the control-grid of pentode 51, the pentode 51 will normally take current, the voltage occurring across a grid resistance 53, which constitutes a potentiometer connected between the anode of pentode 51 and earth, being insufficient to remove the cut-off condition of the pentode 51' provoked by a cathode resistance which is preferably common to all pulse generators.

At the end of a gating pulse produced by the pulse generator 42, which precedes the said pulse generator 43, the control-grid of the pentode 51 has fed to it, through coupling lead 55, a negative pulse which causes the pulse generator 43 to flip over from the condition of rest to the working condition; after a lapse of time substantially determined by the charging time of coupling condenser automatic reversal of the pulse generator 43 to the position of rest would occur; in the present case, however, exactly before this instant the control-grid of the pentode 51' has fed to it, through lead 40', a negative-going control-pulse which determines the instant of reversal. On the pulse generator 43 flipping back into the condition of rest a negative voltage pulse is produced which, through coupling condenser 56, excites the next-following pulse generator 44.

During the time the pulse generator 43 is not in its condition of rest, the anode resistance 52 of the pentode 51 has applied to it a positive-going rectangular voltage pulse which serves as a gating pulse for the third transmitting channel and which, through coupling condenser 57, causes the normally cut-off pulse modulator 33 to become conductive.

The transmission channels 21 to 29 furthermore comprise amplifiers 61 to 69 for sawtooth voltages of control-frequency which are derived from the pulse generator 60. The sawtooth voltages to be amplified are fed in parallel combination, through lead 70 to all sawtooth amplifiers.

All the sawtooth amplifiers are again identical and only that of the third transmission channel is more fully described with reference to the detail view.

The sawtooth voltage to be amplified is fed, through a coupling condenser 71, to the control-grid of a pentode amplifying tube 73, which is negatively fed back by a resistance 72 included in the cathode lead; the sawtooth voltage set up across the anode resistance 74 is fed through a coupling condenser 75 to an output resistance 76. This output resistance 76 forms part of the grid circuit of a first control-grid of the tube arranged in the pulse modulator 33.

The speech channels 22 to 29 each comprise, in addition to the elements already mentioned (pulse modulator, gating-pulse generator, sawtooth voltage amplifier) a low-frequency amplifier 82 to 89, of which only that included in the third transmission channel is shown in detail-diagram, since the amplifiers in the remaining channels are exactly identical.

The low-frequency signal voltage for the third transmission channel, which voltage is required to be amplified and conveyed is fed through a coupling condenser 91 to the control-grid of a pentode 93. The amplified signal voltage occurring across the anode resistance is fed, through a coupling condenser 95 to an output resistance 96. Similar to the output resistance 76 of the sawtooth-voltage amplifier 63, this output resistance 96 forms part of the first control-grid circuit of the pulse modulator 33. For this purpose, the output resistances 76 and 96 are connected in series, the latter being shunted by a condenser 97, which constitutes a short-circuit for sawtooth-voltages from the amplifier 63, the fundamental frequency of which appreciably exceeds the highest frequency of the signals to be transmitted.

As a matter of course, the synchronizing channel 21 does not comprise a low-frequency amplifier. However, if the channel units are mounted according to the circuit-diagram shown on a mounting tray or chassis, the space thus becoming available may, if desired, be utilized for mounting a spare low-frequency amplifier.

The pulse modulator 33 in the channel 23 comprises a secondary-emission tube 100 having a first and a second control grid 101 and 102 respectively, an intermediate screen-grid, an auxiliary cathode 103 emitting secondary electrons and an anode 104. The second control-grid 102 has fed to it, through a grid resistance 105 a negative bias voltage which is high enough for the tube 100 to remain cut off, during the occurrence of a positive-going gating pulse fed to this control-grid through coupling condenser 57, unless the potential of the first control-grid exceeds a given negative threshold value in a positive sense.

The first control-grid 101 is earthed via one of the resistances 76 and 96, which constitute the output resistances for the sawtooth voltage amplifier and the low-frequency amplifier respectively. In the absence of an output alternating voltage of the low-frequency amplifier 83 the first control grid 101, due to the occurrence of grid current on the peaks of the sawtooth voltage supplied to the control-grid 101, will be given a mean negative bias voltage which corresponds to half the amplitude of the sawtooth voltage. The negative bias voltage of the second control-grid 102 of the pulse modulator 33 is chosen to be such that during the occurrence of a gating pulse on the second control-grid and with a potential of the first control-grid that corresponds to a negative bias-voltage just now mentioned which acts as the threshold value, a further increase in potential of the first control-grid so as to exceed this threshold value in a positive sense, causes the anode current of the tube to start and to continue until the threshold value is again exceeded, but now in a negative sense.

In the presence of a low-frequency signal voltage the maximum amplitude of which must be smaller than half the amplitude of the sawtooth voltage, the occurrence of sawtooth and signal voltages in superimposure on the first control-grid 101 will cause the start of the anode current of the tube 101 to be accelerated or delayed, in accordance with the instantaneous polarity of the low-frequency signal to an extent varying with the instantaneous values of the signal voltage, and cause the tube to be conductive for the remaining part of the sawtooth period, since exceeding the threshold value above referred to in a negative sense is only brought about for the first control-grid by the steep flank of the sawtooth voltage fed to this control-grid.

During each occurrence of a release-pulse, there is produced in the anode circuit of the tube 100 a current impulse, the duration of which varies with the modulating low-frequency signal; the tube 100 thus provides a pulse-width modulation which characterizes the low-frequency signal.

In a similar manner current pulses are derived from the other pulse modulators 32 and 34 to 39; the current pulses of all pulse modulators 32 to 39 occur in succession, since the modulators are released in succession by the gating pulses.

The anode circuits of the pulse modulators 32 to 39 have a common output resistance which is constituted by the primary 106 of a transformer 107 comprising a high-frequency iron core and acting as a discriminating network common to all conversation channels 22 to 29. The secondary 109, which is shunted by a resistance 108, has set up across it, every time at the beginning and at the end of a current pulse through the primary 106, positive-going and negative-going voltage pulses respectively, which are fed through a series resistance 110 and a grid-current limiting resistance 111 to the control-grid of a secondary-emission tube 112 connected as an amplifier. Owing to a cathode resistance 113 and its parallel condenser 114 included in the cathode lead of this tube the control grid of this tube is negatively biassed so that normally the tube is substantially cut off and becomes operative only due to the positive-going voltage pulses derived from the transformer 107. The negative voltage pulses coinciding with the end of the current pulses derived from the pulse modulators 32 to 39 are consequently suppressed.

The amplitude of the positive pulses fed to the control-grid of the tube 112 is chosen to be considerably in excess of the available grid-control space, so that limitation of the amplitude of the positive pulses results from the occurrence of grid current and the presence of limiting resistance 111.

Since the phase of the fronts of the current pulses taken from the pulse modulators 32 to 39 varies with the various low-frequency signals to be transmitted, the positive voltage pulses periodically coinciding with the fronts of the pulses will characterize the various low-frequency signals by their phase shift. The amplified and limited positive voltage pulses are taken from an output resistance 115 included in the auxiliary cathode lead of the secondary-emission tube and fed, through a coupling condenser 116, to a modulator 117 for amplitude, phase or frequency modulation of a carrier oscillation generated by an oscillator 118. The modulated carrier oscillation is fed to a transmitting aerial 119 and emitted.

It has been noted above that the synchronizing-channel cascade but for the low-frequency amplifier which as a matter of course, is absent therefrom largely corresponds, as far as construction and circuit-arrangement are concerned, with the conversation-channel cascades. The synchronizing channel 21 thus comprises a pulse modulator 31, a gating-pulse generator 41 and a sawtooth voltage amplifier 61, which substantially correspond with similar units in the conversation channels 21 to 29.

Introduced into the circuit of the first control-grid 121 of the pulse-modulator tube 120 is only the sawtooth voltage set up across the output resistance 76' of the sawtooth-voltage amplifier 61 and no low-frequency signal. If the adjustment of the bias on the second control-grid 122 of the pulse-modulator tube 120 is otherwise identical with other pulse modulators 32 to 39, it will therefore take current only during the latter half of a sawtooth period coinciding with the gating pulse from the pulse generator 41. This current pulse supplies a positive-going voltage pulse to a resistance 123 included in the auxiliary cathode lead of the secondary-emission tube 120, the voltage pulse being fed through a coupling condenser 124 to the output resistance formed by the resistances 108 and 110 and the secondary 109 of the transformer 107. These pulses, similar to the pulses from the transformer 107, are thus fed, through the grid-current limiting resistance 111, to the control-grid of the amplifying tube 112.

The synchronizing pulses from the pulse modulator 31 are, however, not fed through a discriminating network, to the amplifying tube 112 and are thus differentiated by their longer duration compared with the pulses which characterize the various low-frequency signals. The voltage pulses set up across the output resistance 115 of the amplifying tube 112 thus correspond with the pulses shown in Fig. 3, as aimed by the invention.

In contradistinction to the anodes of the other modulator tubes, the anode of the modulator tube 120 is connected to the positive anode-voltage terminal directly, i. e. without the intermediary of the primary transformer winding 106.

The use of the construction of a multiplex transmitter as above described provides a particularly surveyable arrangement and permits of constructing similar units of the various channels so as to be directly interchangeable.

What I claim is:

1. A multiplex communication system for the transmission of phase-modulated pulses comprising a plurality of pulse modulators each responsive to an applied saw-tooth voltage to produce a pulse whose duration depends on the amplitude of said saw-tooth voltage, said modulators being rendered sequentially operative periodically at a predetermined rate, means periodically to generate a saw-tooth voltage of constant amplitude at a rate equal to said predetermined rate multiplied by the number in said plurality, means to apply said saw-tooth voltage as an input to said pulse modulators, means to apply individual intelligence signals to all but the first of said sequentially operated pulse modulators to vary the amplitude of the saw-tooth voltage applied thereto in accordance with the instantaneous amplitude of said signals whereby the pulse produced in said first modulator is of constant duration and serves as a synchronizing pulse while the pulses sequentially produced in the succeeding modulators each exhibit a duration in accordance with the instantaneous amplitude of a respective intelligence signal, a common output circuit coupled to said pulse modulators, and differentiating means interposed between said output circuit and all of said modulators excepting said first modulator for converting the duration-modulated pulses into phase-modulated pulses, said synchronizing pulse being produced by said first modulator solely in the latter half of the period in which said first modulator is operative.

2. A multiplex communication system for the transmission of phase-modulated pulses comprising a plurality of pulse modulators each responsive to an applied saw-tooth voltage to produce a pulse whose duration depends on the amplitude of said saw-tooth voltage, gating means for periodically at a predetermined rate rendering said pulse modulators sequentially operative, means periodically to generate a saw-tooth voltage of constant amplitude at a repetition rate equal to said predetermined rate multiplied by the number in said plurality, means to apply said saw-tooth voltage as an input to said pulse modulators, means to apply individual intelligence signals to all but the first of said sequentially operated pulse modulators to vary the amplitude of the applied saw-tooth voltage in accordance with the instantaneous amplitude thereof whereby the pulse produced in said first modulator is of constant duration and serves as a synchronizing pulse while the pulses sequentially produced in the succeeding modulators each exhibit a duration in accordance with the instantaneous amplitude of a respective intelligence signal, a common output circuit coupled to said pulse modulators, and a differentiating network interposed between said output circuit and all of said modulators excepting said first modulator for converting the duration-modulated pulses into phase-modulated pulses, said synchronizing pulses being produced by said first modulator solely in the latter half of the period in which said first modulator is operative, the trailing edge of said synchronizing pulse coinciding with the termination of said period.

3. A multiplex communication system for the transmission of phase-modulated pulses comprising a plurality of pulse modulators each responsive to an applied saw-tooth voltage to produce a pulse whose duration depends on the amplitude of said saw-tooth voltage, gating means for periodically at a predetermined rate rendering said pulse modulators sequentially operative, said gating means including a like plurality of pulse generators each producing a rectangular pulse in response to an applied triggering voltage, said generators being connected in cascade relation such that the actuation of the first generator in said cascade sequentially actuates the succeeding generators, means to apply a triggering voltage to the first generator in said cascade with a periodicity corresponding to said predetermined rate and means to apply the rectangular pulses yielded by said generators to the corresponding pulse modulators to render same sequentially operative, means periodically to generate a saw-tooth voltage of constant amplitude at a rate equal to said predetermined rate multiplied by the number in said plurality, means to apply said saw-tooth voltage as an input to said pulse modulators, means to apply individual intelligence signals to all but the first of said sequentially operated pulse modulators to vary the amplitude of the applied saw-tooth voltage in accordance with the instantaneous amplitude thereof whereby the pulse produced in said first modulator is of constant duration while the pulses sequentially produced in the succeeding modulators each exhibit a duration in accordance with the instantaneous amplitude of a respective intelligence signal, a common output circuit coupled to said pulse modulators, and a differentiating network interposed between said output circuit and all of said modulators excepting said first modulator for converting the duration-modulated pulses into phase-modulated pulses.

4. A system, as set forth in claim 3, wherein each of said rectangular pulse generators is constituted by an unbalanced trigger circuit normally remaining in one equilibrium state and reverting to said state after a predetermined interval subsequent to being triggered into another equilibrium state by an applied triggering voltage, the trigger circuits being coupled in cascade relation such that each succeeding generator is triggered at the trailing edge of the rectangular pulse yielded in the preceding generator.

5. A multiplex communication system for the transmission of phase-modulated pulses comprising a plurality of pulse modulators each responsive to an applied saw-tooth voltage to produce a pulse whose duration depends on the amplitude of said saw-tooth voltage, gating means for periodically at a predetermined rate rendering said pulse modulators sequentially operative, said gating means including a like plurality of pulse generators each producing a rectangular pulse in response to an applied triggering voltage, said generators being connected in cascade relation such that the actuation of the first generator in said cascade sequentially actuates the succeeding generators, means to apply a triggering voltage to the first generator in said cascade with a periodicity corresponding to said predetermined rate and means to apply the rectangular pulses yielded by said generators to the corresponding pulse modulators to render same sequentially operative, means periodically to generate a saw-tooth voltage of constant amplitude at a rate equal to said predetermined rate multiplied by the number in said plurality, a like plurality of saw-tooth voltage amplifiers, means to apply said saw-tooth voltage through said amplifiers respectively as an input to said pulse modulators, amplifying means to apply individual intelligence signals to all but the first of said sequentially operated pulse modulators to vary the amplitude of the applied saw-tooth voltage in accordance with the instantaneous amplitude thereof whereby the pulse produced in said first modulator is of constant duration while the pulses sequentially produced in the succeeding modulators each exhibit a duration in accordance with the instantaneous amplitude of a respective intelligence signal, a common output circuit coupled to said pulse modulators, and a differentiating network interposed between said output circuit and all of said modulators excepting said first modulator for converting the duration-modulated pulses into phase-modulated pulses.

6. An arrangement, as set forth in claim 5, wherein said triggering voltage is derived from a first periodic voltage circuit and said saw-tooth voltage is derived from a second periodic voltage circuit, said arrangement further including a sinusoidal wave oscillator whose frequency corresponds to the repetition rate of said saw-tooth voltage, said first and second circuits being maintained in synchronism with said oscillator.

7. A multiplex communication system for the transmission of phase-modulated signal pulses comprising: a plurality of transmission channels, means to render said channels periodically operative in accordance with a predetermined cycle frequency, means to render said channels successively operative in accordance with a predetermined control frequency whereby each channel is active during a predetermined control period, means in one of said channels producing synchronizing pulses at a rate corresponding to said cycle frequency, and means in the other of said channels producing signal pulses at a rate corresponding to said cycle frequency, said synchronizing pulses being characterized by a fixed duration which is long relative to the duration of said signal pulses, said synchronizing pulses occurring substantially during the latter half of the control period of said one of said channels.

8. A system, as set forth in claim 7, wherein the trailing edge of said synchronizing pulse coincides with the end of the control period of said one of said channels.

CORNELIS JOHANNES
HENRICUS ANTONIUS STAAL.

REFERENCES CITED

The following references are of record in the file of this patent:

UNITED STATES PATENTS

| Number | Name | Date |
|---|---|---|
| 2,428,118 | Labin et al. | Sept. 30, 1947 |
| 2,437,300 | Labin et al. | Mar. 9, 1948 |
| 2,471,138 | Bartelink | May 24, 1949 |
| 2,492,004 | Potier | Dec. 20, 1949 |
| 2,497,411 | Krumhansl | Feb. 14, 1950 |